US006410068B2

(12) United States Patent
Goldston

(10) Patent No.: US 6,410,068 B2
(45) Date of Patent: Jun. 25, 2002

(54) METHOD FOR BREWING COFFEE USING A RELOCATABLE COFFEE MAKER

(76) Inventor: Joseph P. Goldston, 21668 Jade Woods Dr., Bristol, VA (US) 24202

( * ) Notice: Subject to any disclaimer, the term of this patent is extended or adjusted under 35 U.S.C. 154(b) by 0 days.

(21) Appl. No.: 09/872,697

(22) Filed: Jun. 1, 2001

Related U.S. Application Data

(62) Division of application No. 09/345,184, filed on Jun. 30, 1999, now Pat. No. 6,240,830.

(51) Int. Cl.[7] .................................................. A23F 5/00
(52) U.S. Cl. ....................................... 426/433; 426/594
(58) Field of Search ................................. 426/433, 594; 99/279, 290

(56) References Cited

U.S. PATENT DOCUMENTS

| 294,337 A | 2/1884 | Seldomridge |
| 1,828,535 A | 10/1931 | Kass |
| 2,868,558 A | 1/1959 | Krauss |
| 4,413,834 A | 11/1983 | Base |
| 4,821,347 A | 4/1989 | Nash |
| 4,974,500 A | 12/1990 | Boyd et al. |
| 4,979,524 A | 12/1990 | Anderson |
| 5,040,808 A | 8/1991 | McIntyre |
| 5,106,141 A | * 4/1992 | Mostashari |
| 5,393,548 A | 2/1995 | Heiligman |
| 5,564,805 A | 10/1996 | Dickinson |
| 5,823,490 A | 10/1998 | Buono |
| 6,240,830 B1 | 6/2001 | Goldston |

FOREIGN PATENT DOCUMENTS

DE 33 11 290 A1 10/1984

* cited by examiner

*Primary Examiner*—Anthony J. Weier
(74) *Attorney, Agent, or Firm*—Knobbe, Martens, Olson & Bear, LLP

(57) ABSTRACT

A counter top coffee maker is rolled out from a storage location on a mobile base on a counter. The base includes a set of wheels and a set of bumpers. The wheels are used to move the base by lifting the bumpers off the counter surface. The bumpers are used to maintain the base in a stationary position.

5 Claims, 3 Drawing Sheets

METHOD FOR BREWING COFFEE USING A RELOCATABLE COFFEE MAKER

RELATED APPLICATIONS

The present application is a division of application Ser. No. 09/345,184 filed Jun. 30, 1999, now U.S. Pat. No. 6,240,830.

BACKGROUND OF THE INVENTION

1. Field of the Invention

The present invention relates to the field of appliances. More particularly, the present invention relates to improvements to counter top appliances that enable the relocation of the appliances.

2. Description of the Related Art

Appliances are used in nearly every room of a modem household. A washing machine is usually in a laundry room, a hair dryer is in a bathroom, a dishwasher is in the kitchen. Counter-top appliances are those appliances that are generally found on a counter in a kitchen. Examples of counter-top appliances include a toaster, a coffee maker, and a blender. The counter-top appliances are generally stored and used on the same counter area.

The bottom of the counter-top appliance base usually includes cushions or bumpers. The bumpers are generally employed to prevent the appliance from moving during operation. The bumpers are also used to support the appliance in a stable position, and prevent vibrations from damaging the counter surface.

Often times, the counter-top appliance is moved from one position on the counter to another position. Some of the reasons for moving the counter-top appliance may include filling water in a coffee maker, cleaning the appliance, or simply using the appliance at a location on the counter that is different from the location where the appliance is stored. Often, a top-loading appliance, i.e., one that receives material to be processed from an opening at its top portion, such as a coffee maker, is stored on the counter under the kitchen cabinets. To load the appliance, it must be moved away from under the cabinets. When the counter-top appliance is moved, the appliance is dragged along the counter or lifted off the counter. The bumpers on the appliance base are not conducive to relocation. The appliance is often jarred as it is dragged along the counter. The appliance may be damaged, such as by the bumpers breaking, in the processing of moving around the counter because the bumpers are generally intended to prevent movement. Therefore, there is a need for an apparatus that allows for an appliance to be easily moved from one position on the counter to another.

SUMMARY OF THE INVENTION

In accordance with the present invention, there is presented a counter-top appliance base which enables the simple relocation of the appliance around a counter. The base includes at least two rolling elements, such as wheels, on one end of the base. The opposite end of the base may include conventional bumpers or another set of lockable rolling elements.

DETAILED DESCRIPTION OF THE PREFERRED EMBODIMENT

The structure and operation of a base of the present invention will now be disclosed. The structure of the base will first be described with reference to drawings of a preferred embodiment of a base. The operation of a base loaded with a counter top appliance will then be described with reference to the drawings of the base.

Figure 1:
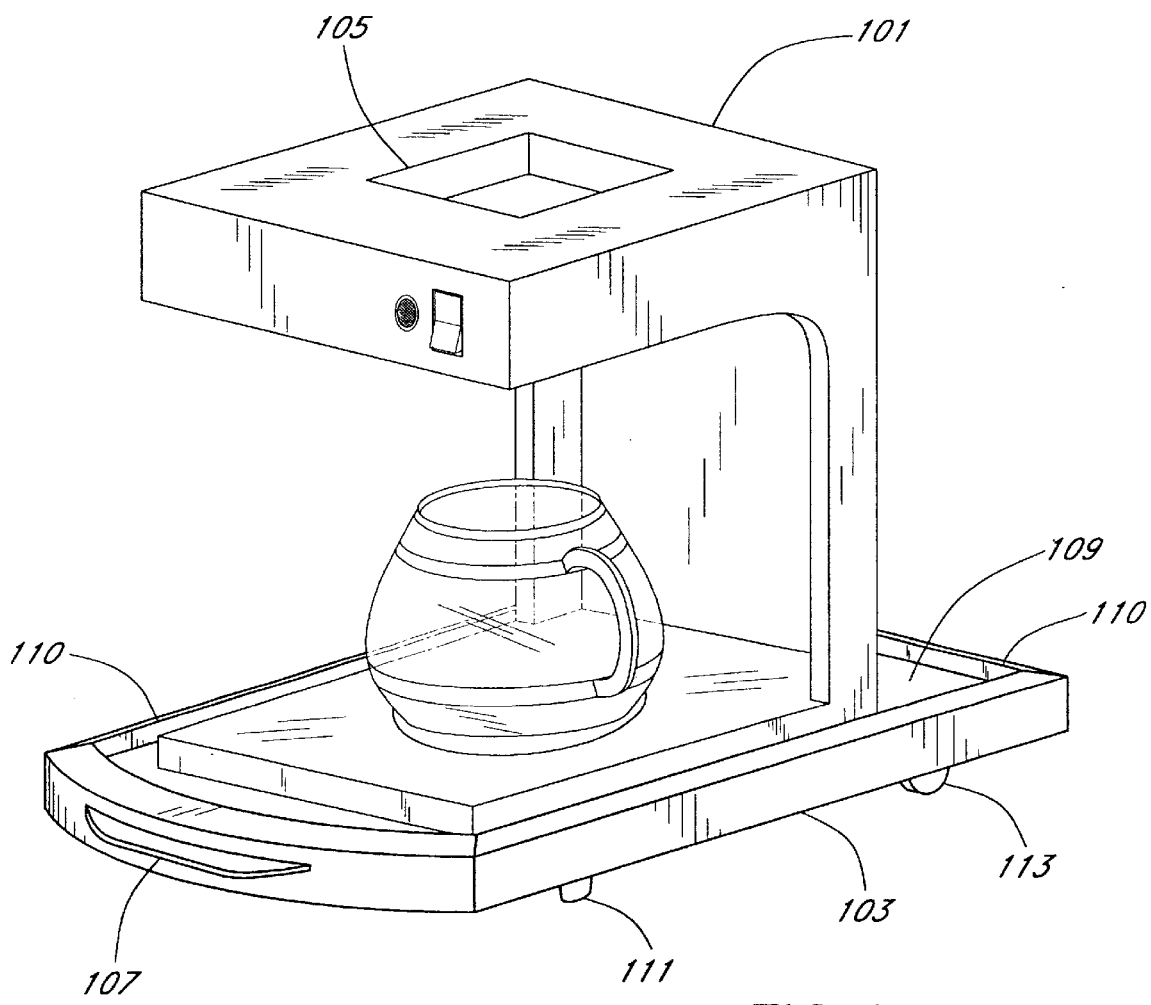
FIG. 1 illustrates a top-loading counter top appliance positioned on a base of the present invention.

FIG. 1 illustrates a base 103 of the present invention that is loaded with a counter top appliance 101. The counter top appliance of FIG. 1 is a top loading appliance such as for example, a coffee maker. The appliance includes a top opening 105 for loading water into the appliance. As may be appreciated from FIG. 1, the loading of the appliance may be hindered by a cabinet that is located directly above the appliance because the opening 105 is not accessible.

The base 103 is loaded with the counter top appliance 101 by placing the appliance within the recessed top portion 109 of the base 103 (herein after "base top"). The surface of the base top 109 is preferably covered by non-slip material such as rubber. In the alternative, the base itself may be constructed from a material that, in combination with the textur of the base top 109, prevents the loaded appliance from slipping. The base additionally includes a lip portion 110 (herein after "lip") that surrounds the base top 109. The lip 110 operates to prevent the loaded appliance 101 from slipping off the base top 109.

The bottom of the base (FIG. 2) includes a set of rubber stoppers 111 (herein after "stoppers") and a set of wheels 113. The wheels 113 are preferably made of soft rubber so as to prevent the jarring of the appliance 101 when it is transported along a counter. The stoppers 111 are used to maintain the base in position, when it is not used to relocate the loaded appliance 101. The stoppers 111 are preferably rubber pylon shaped bumpers that have a friction coefficient high enough so as to prevent the movement of the base 103 when loaded with an appliance.

The base 103 includes a handle 107 that allows for the relocation of the base. The handle 107 is attached to the front of the platform on the stopper end. The handle 107 is used to lift the bumpers base 103 from the counter surface. By lifting the stoppers 111 from the counter surface, the base 103 can be maneuvered to another position on the counter surface. When the stoppers 111 are off the counter surface, the wheels 113 are allowed to rotate, thereby enabling the relocation of the base 103.

Figure 2:
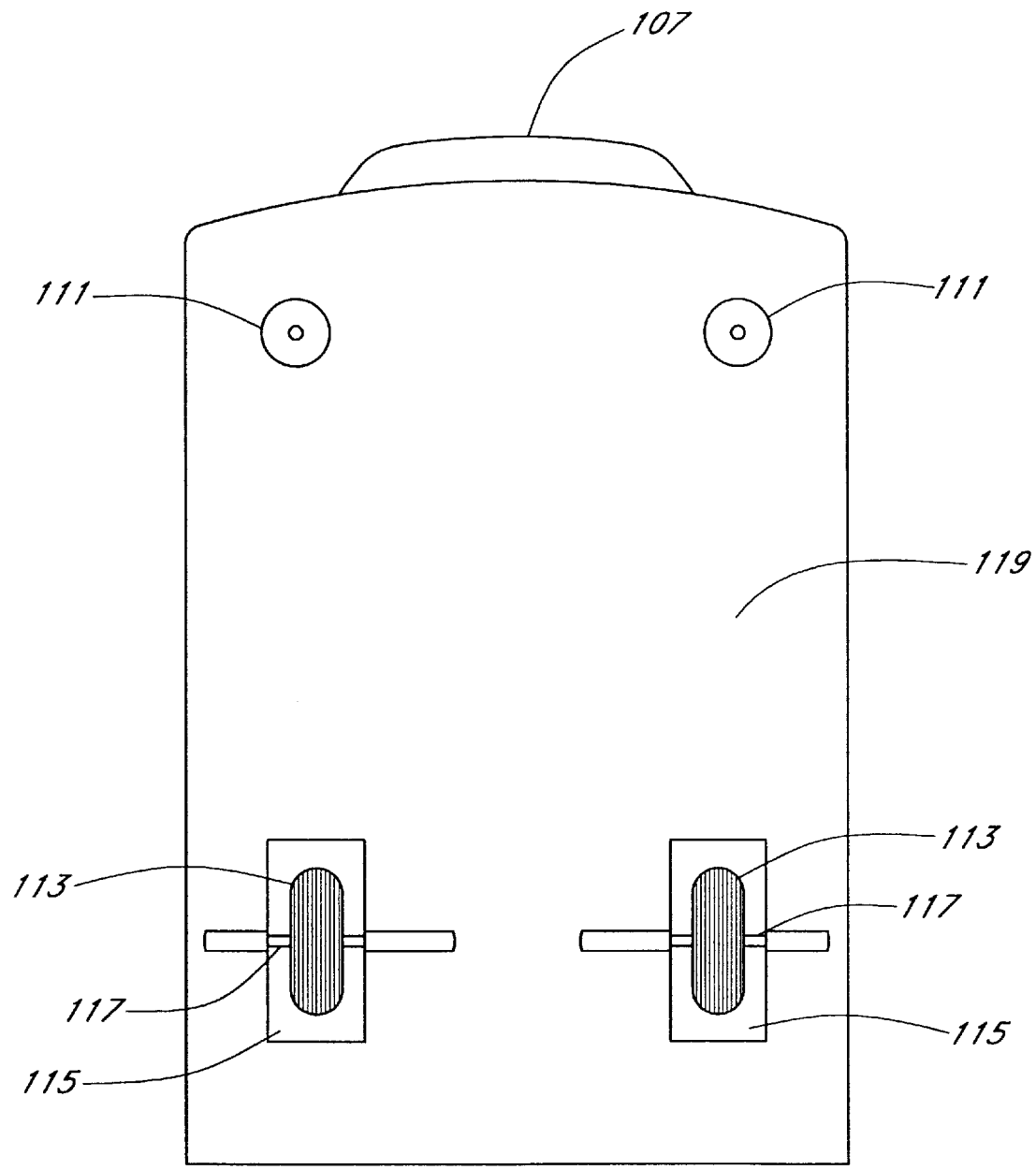
FIG. 2 is a bottom view of the base of FIG. 1.

FIG. 2 illustrates a bottom view of the base 103 of FIG. 1. The bottom of the base includes a pair of grooves 115 for the wheels 113. The grooves 115 are deep enough so as to allow for the wheels 113 to freely rotate while secured in the groove by an axle 117. The axle 117 is preferably made from a rigid material so as to prevent the wheel 113 from engaging the base 103 when the base is loaded. The grooves may be formed, for example, by an injection molding process.

Figure 3:
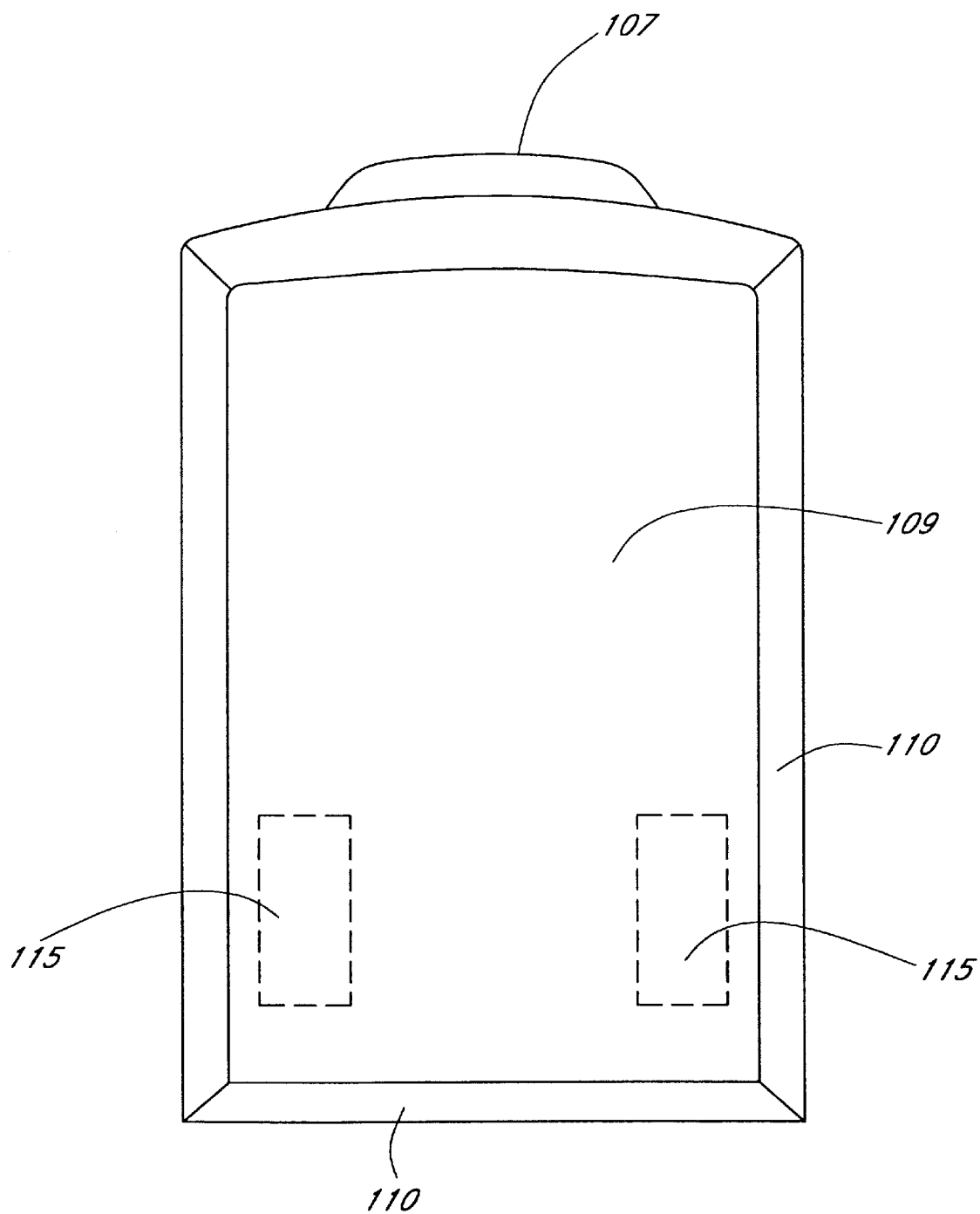
FIG. 3 is a top view of the base of FIG. 1.

FIG. 3 illustrates a top view of the base 103 of FIG. 1. The top of the base includes the base top 109, the lip 110, and the handle 107. From the view of FIG. 3, it can be appreciated that the lip 110 completely surrounds the base top 109 so as to prevent the slipping of the loaded appliance 101 in all directions.

In operation, the appliance 101 is first loaded onto the base top 109. When the appliance 101 is to be moved from one position on the counter to another, the user engages the handle 107 to lift the front of the base 103. The distance that the wheels extend from the base 103, and the location of the wheels relative to the back of the base, controls the maximum title of angle for the base when the handle 107 is raised. At the maximum tilt angle, the outer edge of the base bottom is in contact with the counter surface. The outer edge of the base bottom, wheel 113 bottom, and axle 117, form sides of a triangle that defines the maximum tilt angle. Preferably, the wheel 113 location and extension are selected in accordance with the equation provided below such that the $$\theta = \text{Tan}^{-1}\left(\frac{D_1}{D_2}\right)$$

maximum angle of tilt is less than that which causes the appliance to tip off the base top 109. The angle is provided by the following equation: Where $D_1$ is the distance between the wheel bottom and the corresponding axle, and $D_2$ is the distance between the wheel bottom and the edge of the base bottom. The maximum tilt angle is generally between 1 and 30 degrees. Preferably, the maximum tilt angle is between 10 and 25 degrees.

The invention is equally applicable to counter-top appliances that are pre-manufactured with at least one rolling element, such as a wheel at their bottom. The counter-top appliance can be manufactured with a handle so as to allow for the lifting of stoppers or other securing elements and rolling the appliance on the rolling elements provided.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is intended to be defined by the claims that follow.

What is claimed is:

1. A method of brewing coffee, by using a coffee maker that is positioned in a first location on a counter, comprising:

lifting a handle that is attached to the coffee maker to tilt the coffee maker;

rolling the coffee maker, while the coffee maker is tilted, to a second position on said counter;

lowering the handle to provide the coffee maker in the second position on said counter;

filling water in the coffee maker;

lifting the handle to tilt the coffee maker;

rolling the coffee maker, while the coffee maker is tilted, to the first position on said counter;

lowering the handle to provide the coffee maker in the first position on said counter; and brewing coffee by activating the coffee maker in said first position.

2. A method of brewing coffee, by using a coffee maker that is positioned in a first location on a counter, comprising:

lifting one end of the coffee maker such that the coffee maker is supported on one or more rolling elements;

rolling the coffee maker on the one or more rolling elements, while the one end of the coffee maker is lifted, to a second position on said counter;

lowering the one end of the coffee maker in the second position on said counter;

filling water in the coffee maker; and brewing coffee by activating the coffee maker.

3. The method of claim 2, wherein brewing coffee by activating the coffee maker is performed while the coffee maker is in the second position on said counter.

4. The method of claim 2 further comprising:

rolling the coffee maker, while the one end of the coffee maker is lifted, to the first position on said counter;

lowering the handle to provide the coffee maker in the first position on said counter.

5. The method of claim 4, wherein brewing coffee by activating the coffee maker is performed while the coffee maker is in the first position on said counter.

* * * * *